June 16, 1931.  W. B. HILL ET AL  1,810,175
LUBRICATING MEANS
Filed March 2, 1929
Fig. 1
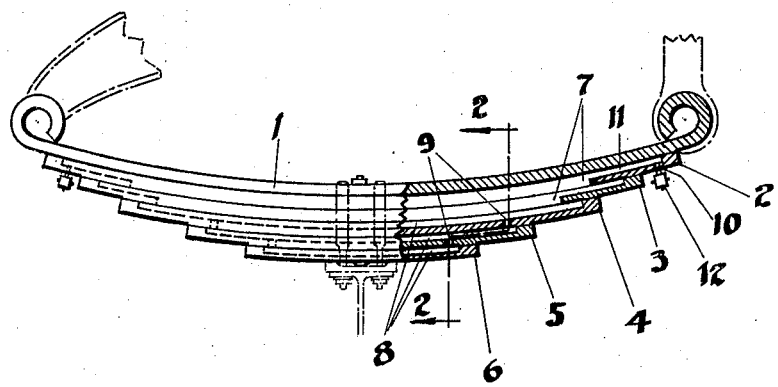
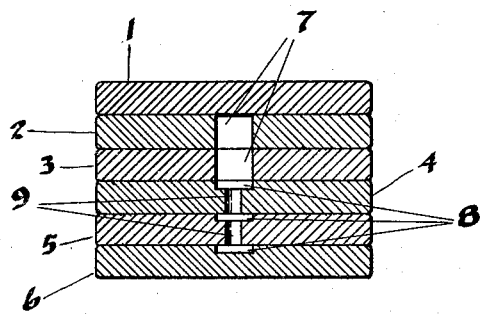
Fig. 2.
Inventors
WARD B. HILL.
VIRGIL M. WATT.
By Owen H. Spencer
Attorney Patented June 16, 1931

1,810,175

UNITED STATES PATENT OFFICE

WARD B. HILL AND VIRGIL M. WATT, OF INDIANAPOLIS, INDIANA

LUBRICATING MEANS

Application filed March 2, 1929. Serial No. 344,033.

This invention relates to improvements in lubricating means designed primarily for use in connection with vehicle leaf springs, and one feature of the invention is the provision of lubricant receiving channels in the leaves of the spring and so constructed that the leaves of the springs will not be materially weakened.

A further feature of the invention is the provision of means for conveying lubricant to points between all of the leaves constituting the spring so that the contacting faces of all the leaves will be thoroughly lubricated.

A further feature of the invention is the provision of valves or ports through which the lubricant may be introduced into the lubricant receiving channels.

Other objects and advantages will be hereinafter more fully set forth and pointed out in the accompanying specification.

In the accompanying drawings which are made a part of this application,

Figure 1 is a side elevation, partly is section, of a spring with the lubricating device attached thereto, and, Figure 2 is a transverse sectional view of the spring, as seen on line 2—2, Figure 1, on an enlarged scale.

Referring to the drawings, 1 indicates the main leaf of a spring, to which are added a plurality of cooperating leaves 2, 3, 4, 5 and 6, which are assembled with the main leaf 1 in the conventional manner.

In springs of this nature it has been found difficult to properly lubricate between the leaves of the spring without rendering them unsightly from placing lubricant applying means exteriorly of the spring, or saturating the exterior faces of the spring with lubricant.

To overcome these objectional features, one or more of the leaves are provided with longitudinally extending slots 7, preferably in the leaves 2 and 3, which are formed entirely through the leaves, from points adjacent their ends, although it will be understood that the slots may be made in a greater or less number of the leaves.

The remainder of the leaves are provided in their upper faces with channels 8, which are but part way through the leaves and extend lengthwise thereof, in this instance being formed in the leaves 4, 5 and 6, each of the leaves 4, 5 and 6 having ports 9, through which the lubricant from the slots 7 may pass into the channel of the next succeeding leaf, until all the channels 8 are supplied with lubricant.

With this form of device, a more or less heavy lubricant may be successfully used, such as 600 W, the feeding of the lubricant being so regulated that the lubricant will be used up without exuding from between the edges of the spring.

The lubricant is introduced through valves or ports 10, which are attached to the leaf 2 adjacent each end thereof, said valves 10 communicating with channels 11, in the upper face of the leaf 2, which in turn communicate with the slots 7. The lubricant is introduced into the slots 7 in any conventional manner, as by means of the conventional grease gun (not shown).

After the prescribed quantity of lubricant has been entered into the slots 7, the caps 12 of the valves 10 are returned to position over the valves, thus rendering the spring substantially dust proof and preventing leakage of lubricant through the valves.

The leaves of the spring used in this example are slightly downwardly curved from their outer ends to their centers so that the lubricant will feed by gravity towards and thoroughly lubricate the leaves from end to end of the spring, and by causing the lubricant to feed outwardly towards the side edges of the spring, any grit, dust or other foreign particles will be carried away from the center of the spring end thus maintaining the lubricant in a purer state.

It will likewise be seen that by leaving the main leaf 1 in its natural state, the spring, as a whole, will not be materially weakened by forming the slots and channels in the remainder of the leaves.

While we have illustrated in a general way, certain instrumentalities which may be employed in carrying our invention into effect, it is evident that many modifications may be made in the various details, without departing from the scope of the appended claim, it being understood that our invention is not restricted to particular forms, herein described.

What we claim is:

In a lubricating means for springs or the like, a main spring leaf, one or more spring leaves having slots extending longitudinally thereof from points adjacent their ends, the extreme end portions of said slots being partway through said leaves and the remaining portion entirely therethrough, said slots forming a lubricant reservoir, additional spring leaves having channels extending longitudinally thereof from points adjacent their ends, said additional spring leaves having ports adjacent their ends for successively feeding the lubricant from the reservoir to the succeeding leaves, the ends of each succeeding slot extending a distance beneath the solid bottom portions of the preceding slot and the ends of each succeeding channel extending a distance beyond the opening through the preceding spring, and means for introducing lubricant into said reservoir adjacent the outer ends thereof.

In testimony whereof, we have hereunto set our hands on this the 26 day of February, 1929, A. D.

WARD B. HILL.
VIRGIL M. WATT.